United States Patent Office 3,298,798
Patented Jan. 17, 1967

3,298,798
BOROHYDRIDES OF BORANATES OF HEAVY METAL COMPLEXES
Eberhard Zirngiebl and Alex Bürger, Leverkusen, Germany, assignors to Farbenfabriken Bayer Aktiengesellschaft, Leverkusen, Germany, a corporation of Germany
No Drawing. Filed Jan. 20, 1959, Ser. No. 787,838
Claims priority, application Germany, Feb. 7, 1958,
F 24,996
7 Claims. (Cl. 23—358)

The boronates or borohydrides of the alkali metals and alkaline earth metals have been known for a relatively long time and can be obtained relatively easily. A great number of attempts have been made to produce the boranates of the heavy metals. As far as these compounds are known they are, however, very unstable substances extremely liable to decomposition. This is understandable, in that numerous metals in elementary form or in the form of compounds catalytically decompose boranates.

The present invention is concerned with new boranates or borohydrides of heavy metal complexes and a process for the production of such boranates of heavy metal complexes which process consists in that a metal compound which contains the metal combined in complex form, or a metal compound dissolved in a complex forming solvent, is reacted with an alkali metal or alkaline earth metal boranate. Boranates of cationic complexly bound heavy metals are obtained. Complexly bound boranates of e.g. zinc, cadmium, chromium, manganese, cobalt and nickel are obtainable in this manner. Suitable complex coordinate links are ammino, lower alkylene diamine, di-lower alkylenetriamine, tri-lower alkylene diamine, lower alkylamine, carbonato, chloro, and boranate, including more specifically e.g. ammonia, ethylenediamine, diethylenetriamine, methylamine, carbonate, chloride, etc.

According to one preferred form of the invention a complex metal salt is reacted with an alkali metal or alkaline earth metal boranate in aqueous solution or in a solvent containing water.

The reaction is generally carried out at a low temperature, advantageously below the boiling point of the solution.

The precipitation of the reaction product can either be effected by lowering the temperature and/or by displacing the solvent in which the reaction has taken place by another solvent in which the reaction product is sparingly soluble or insoluble.

For purification and/or drying purposes, the crude reaction product can be after-treated with an organic solvent, advantageously acetone, methanol or ethanol, it being possible to work in the presence of ammonia to stabilize the reaction product.

According to the novel process, it is surprisingly possible to isolate substances obtained from heavy metal compounds by reaction with boranates, most of which substances can conveniently be handled at room temperature in air, in spite of the fact that the metals concerned have boranate-destroying catalytic properties. The complex-boranates are split by treatment with an acid, they decompose slowly—in weeks—in aqueous solution, when heated they decompose whereby metal or metal-boroalloys remain. These substances are likely mainly to be salt-like boranates in which the metals are present in a complex bond. For purposes of illustration, the formula

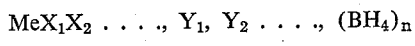

is to be mentioned, in which Me is a metal other than alkaline metal or alkaline earth metal, the X's are suitable complex coordinate links of any desired nature and charge, other boranates, and $n=1, 2, 3$, etc.

The number, charge and multiplicity of the co-ordinate links or of the anions probably obey the known stoichiometric laws. The possibility of the boranate anion $BH_4^-$ also being able to occur as a complex co-ordinate link X is not excluded. Some of the compounds newly prepared appear to exist as non-ionised inner complexes. Therefore the formula given above does not limit the scope of the patent in any way.

The reason for the surprising stability of the metal complex boranates may lie in the generally known change in the chemical properties of the metal which always occur when they are in complex form.

The process for the production of these substances is relatively simple. Either an already existing complex salt is employed as starting material, or such a complex salt is first produced at the time by dissolving a suitable metal compound in a solvent containing the co-ordinate link of the complex. Sodium boranate solution of highest possible concentration is, for example then added in stoichiometric ratio or in excess to this solution and the precipitate which is obtained, and which is often in the form of fine crystals, is then filtered off, it usually being advantageous to maintain an ammonia atmosphere to render trances of acid innocuous.

The substances produced by this process can be stored satisfactorily in the pure state at room temperature when well sealed and protected from the effect of acid and also, in a few cases, from the effect of air. They can be used both for producing catalysts and also as reducing agents, advantageously for catalytic reduction processes, since with this class of compound, catalytic and reducing properties are always combined in the one substance.

*Example 1*

Aqueous nickel sulphate solution is first of all mixed with excess concentrated aqueous ammonia, and then, while cooling with ice, with substantially the theoretical quantity of sodium boranate in aqueous solution. The crystalline violet precipitate which is obtained, has approximately the composition of a hexammine nickel (II)-boranate, after being washed and dried.

*Example 2*

Substantially the stoichiometric quantity of $NaBH_4$ in concentrated aqueous solution is added to a concentrated ammoniacal solution of triethylene diamine-nickel-(II)-chloride $(Ni[C_2H_4(NH_2)_2]_3)Cl_2$ and the reddish-violet crystalline precipitate is isolated, this precipitate having approximately the composition of a triethylene diamine nickel (II)-boranate.

*Example 3*

Zinc acetate is dissolved in a sufficient quantity of concentrated aqueous ammonia and somewhat more than the stoichiometric quantity of a 50% $NaBH_4$ solution is added at 0° C. The colourless crystalline precipitate which is obtained has a composition, after washing and drying, which corresponds substantially to that of tetrammine zinc (II)-boranate.

*Example 4*

Triethylene diamine cobalt (III)-chloride is dissolved in concentrated aqueous ammonia and substantially the stoichiometric quantity of $NaBH_4$, dissolved in a small quantity of water, is added at approximately −10° C. The yellow crystalline substance which is obtained corresponds, according to analysis, to a triethylene diamine cobalt (III)-diboranate chloride.

Example 5

A solution of somewhat more than the stoichiometric quantity of sodium boranate in a small quantity of water is added to a concentrated solution of $CdCl_2 \cdot 2H_2O$ in concentrated aqueous ammonia. It is cooled with iced water. The colourless crystalline reaction product obtained corresponds in its chemical composition to hexammine cadmium (II)-boranate.

Example 6

Excess $NaBH_4$, dissolved in a small quantity of water, is added dropwise at 0° C. to a filtered concentrated solution of $(Cr(NH_3)_6)Cl_3$ in dilute aqueous ammonia. The yellow crystallised precipitate after washing and drying, corresponds in analysis to a hexammine chromium (III)-boranate.

Example 7

0.5 gram of cis-$(Cr-en_2Cl_2)ClH_2O$ [en=ethylene diamine] are dissolved in 8 ml. of water at 20° C. cooled to 0° C. and 4 ml. of concentrated aqueous ammonia are added. 1.5 grams of pulverized sodium boranate are added to the solution. The resulting reddish-violet crystalline product is washed with ice-water and cold ethanol and dried in vacuum over calcium chloride. According to analysis, the reaction product is pure cis-dien-dichlorochromo(III)boranate.

Example 8

Tetrammine carbonatocobalt(III)chloride

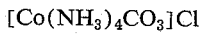

is dissolved in concentrated aqueous ammonia and a slight excess of 50% aqueous sodium boranate solution is added. By treating the dark red solution with alcohol in the cold, dark red crystals precipitate; the composition of the crystals corresponds to tetramminecarbonatocobalt (III)-boranate.

We claim:
1. Hexammine nickel (II)-boranate.
2. Tri(ethylene diamine)nickel (II)-boronate.
3. Tetrammine zinc (II)-boranate.
4. Tri(ethylene diamine)cobalt (III)-diboronate chloride.
5. Hexammine cadmium (II)-boranate.
6. Cis - diethylenediamine - dichlorochromium (III)-boranate.
7. Tetrammine carbonato cobalt (III)-boranate.

References Cited by the Examiner
UNITED STATES PATENTS

| | | | |
|---|---|---|---|
| 2,741,539 | 4/1956 | Banus et al. | 23—14 |
| 3,107,157 | 10/1963 | Johnston | 23—14 X |
| 3,113,832 | 12/1963 | Kollonitach et al. | 23—14 |

OTHER REFERENCES

Hoekstra et al., "Journal of the American Chemical Society," vol. 71, July 1949, pages 2488–92.

Kirk-Othmer, "Encyclopaedia of Chemical Technology," 1st supplement volume, 1957, p. 108.

Marshall et al., "Some Properties of Sodium Borohydride Solutions," AECD–2914, page 4, published by United States Atomic Energy Commission, June 30, 1950.

Moeller, "Inorganic Chemistry," 1952, p. 242.

Moeller, "Inorganic Chemistry," 1952, pp. 857–858.

Parry et al., "Journal of the American Chemical Society," vol. 80, No. 1, pp. 1–3 (Jan. 11, 1958).

Sedgwick, "The Chemical Elements and Their Compounds," 1950, volume II, pages 1016–1019, 1439–1446.

Weissberger, "Technique of Organic Chemistry," 1950, volume III, pages 405–408, 409–414.

Wiberg, "New Results in Preparative Hydride Research," AEC—TR—1931, pp. 21, 22, 23, published by United States Atomic Energy Commission, April 8, 1954.

OSCAR R. VERTIZ, *Primary Examiner.*

MAURICE A. BRINDISI, GEORGE D. MITCHELL,
*Examiners.*

M. WEISSMAN, H. T. CARTER, *Assistant Examiners.*